(12) United States Patent  
Kay et al.

(10) Patent No.: US 7,376,620 B2
(45) Date of Patent: May 20, 2008

(54) SYSTEM AND METHOD FOR MEASURING THE QUALITY OF INFORMATION RETRIEVAL

(75) Inventors: David B. Kay, Los Gatos, CA (US); Denis Lynch, San Jose, CA (US); Mark Angel, Napa, CA (US); Shafi Mohammed, Moutain View, CA (US); Catherine Wormington, San Carlos, CA (US)

(73) Assignee: Consona CRM Inc., Indianapolis, IN (US)

( * ) Notice: Subject to any disclaimer, the term of this patent is extended or adjusted under 35 U.S.C. 154(b) by 1101 days.

(21) Appl. No.: 09/911,839

(22) Filed: Jul. 23, 2001

(65) Prior Publication Data

US 2003/0018626 A1 Jan. 23, 2003

(51) Int. Cl.
*G06Q 40/00* (2006.01)

(52) U.S. Cl. ............................ 705/40; 705/36; 705/35; 705/26

(58) Field of Classification Search .................... 707/2, 707/3, 5; 705/10, 3, 37, 34, 36, 38, 39; 714/4, 5; 709/239
See application file for complete search history.

(56) References Cited

U.S. PATENT DOCUMENTS

| | | | | |
|---|---|---|---|---|
| 5,412,804 A | * | 5/1995 | Krishna | 707/2 |
| 5,659,742 A | * | 8/1997 | Beattie et al. | 707/104.1 |
| 5,754,938 A | | 5/1998 | Herz et al. | 455/4.2 |
| 6,006,218 A | | 12/1999 | Breese et al. | 707/3 |
| 6,055,540 A | | 4/2000 | Snow et al. | |
| 6,151,584 A | * | 11/2000 | Papierniak et al. | 705/10 |
| 6,167,370 A | | 12/2000 | Tsourikov et al. | |
| 6,169,992 B1 | | 1/2001 | Beall et al. | |
| 6,185,550 B1 | | 2/2001 | Snow et al. | |
| 6,347,313 B1 | | 2/2002 | Ma et al. | 707/3 |
| 6,347,317 B1 | | 2/2002 | Singhal | 707/10 |
| 6,359,633 B1 | * | 3/2002 | Balasubramaniam et al. | 345/760 |
| 6,360,213 B1 | * | 3/2002 | Wagstaff et al. | 707/1 |
| 6,411,962 B1 | | 6/2002 | Kupiec | |
| 6,430,558 B1 | | 8/2002 | Delano | 707/5 |
| 6,438,579 B1 | | 8/2002 | Hosken | 709/203 |
| 6,446,061 B1 | | 9/2002 | Doerre et al. | |
| 6,460,029 B1 | | 10/2002 | Fries et al. | 707/3 |
| 6,502,091 B1 | | 12/2002 | Chundi et al. | |
| 6,526,521 B1 | * | 2/2003 | Lim | 714/4 |
| 6,546,388 B1 | | 4/2003 | Edlund et al. | 707/5 |
| 6,556,671 B1 | * | 4/2003 | Beauvois | 379/265.02 |
| 6,581,056 B1 | | 6/2003 | Rao | 707/5 |
| 6,636,853 B1 | | 10/2003 | Stephens, Jr. | 707/10 |

(Continued)

OTHER PUBLICATIONS

EBoodle.com and Google Team to Deliver to Powerful Online Shopping Assisting, PR ,Newswire, New York: Dec. 7, 1999, p. 1.*

*Primary Examiner*—Frantzy Poinvil
*Assistant Examiner*—Clement Graham
(74) *Attorney, Agent, or Firm*—Ice Miller LLP (57) ABSTRACT

In an information retrieval application, a system and method for detecting content holes. A content body is parsed into a plurality of concepts nodes, including a first concept node. A percentage of successful service interactions is determined as a function of concept node and, if the percentage of successful service interactions at the first concept node is below a predefined threshold, a content hole is flagged.

16 Claims, 4 Drawing Sheets

U.S. PATENT DOCUMENTS

| | | |
|---|---|---|
| 6,643,639 B2 | 11/2003 | Biebesheimer et al. |
| 6,643,640 B1 * | 11/2003 | Getchius et al. ............... 707/3 |
| 6,687,696 B2 | 2/2004 | Hofmann et al. ............... 707/6 |
| 6,714,920 B1 * | 3/2004 | Arai ............................ 705/52 |
| 6,732,088 B1 | 5/2004 | Glance ......................... 707/3 |
| 6,766,320 B1 | 7/2004 | Wang et al. |
| 2002/0027567 A1 | 3/2002 | Niamir ....................... 345/738 |
| 2002/0169834 A1 | 11/2002 | Miloslavsky et al. ........ 709/206 |
| 2003/0028448 A1 | 2/2003 | Joseph et al. ................. 705/27 |
| 2005/0055321 A1 | 3/2005 | Fratkina et al. |

* cited by examiner

SYSTEM AND METHOD FOR MEASURING THE QUALITY OF INFORMATION RETRIEVAL

RELATED APPLICATIONS

The following commonly assigned U.S. patent applications are relied upon and hereby incorporated by reference in this application:

U.S. patent application Ser. No. 09/911,841, entitled "ADAPTIVE INFORMATION RETRIEVAL SYSTEM AND METHOD" filed on even date herewith, bearing, U.S. patent application Ser. No. 09/912,247, entitled "SYSTEM AND METHOD FOR PROVIDING A LINK RESPONSE TO INQUIRY" filed on even date herewith, bearing, U.S. patent application Ser. No. 09/798,964, entitled "A SYSTEM AND METHOD FOR PROVIDING AN INTELLIGENT MULTI-STEP DIALOG WITH A USER" filed Mar. 6, 2001, bearing, and U.S. patent application Ser. No. 09/594,083, entitled "SYSTEM AND METHOD FOR IMPLEMENTING A KNOWLEDGE MANAGEMENT SYSTEM," filed Jun. 15, 2000, bearing.

FIELD OF THE INVENTION

The present invention is related to systems and methods for information retrieval, and more particularly to a system and method for measuring the quality of information retrieval.

BACKGROUND INFORMATION

People have increasingly turned to the Internet for the answers to their questions. Such an approach is encouraged by companies; web site support is considerably less expensive than telephone or on-site support. The ability of a company to successfully direct customers, employees and other information seekers to their web site, however, is a function of the amount of success customers expect to meet when they access the site.

In a customer service environment, for example, customers expect prompt and correct answers to their information requests. These information requests may relate to problems with products the customer has purchased, or to questions about products they may decide to purchase in the future. In most cases, the answer to the customer's question exists somewhere within the enterprise. In other cases, the answer may have existed in the enterprise at one time, but is no longer there. The challenge is to find the best answer, helpful content, service, or expert, and to provide it to the customer in a timely manner.

Typical approaches to providing support information to customers on the Internet depend on either a static structure (e.g., predefined hyperlinks) for customers to navigate to the information they need, or simple "lookup" facilities for finding documents or products. Representative "lookup" facilities include database searches and full-text searches for keywords appearing in documents or in product descriptions. These types of approaches are typically not tailored to the additional needed clarifications and the customer (i.e., no personalization) and do not typically engage the customer in a multiple step interaction (no conversational dialog), wherein the information is elicited from the customer.

Other current approaches for providing support information to customers, such as case-based reasoning systems and expert systems, provide a multiple step interaction with customers. They require the business, however, to set up very complex "case" structures or expert-system rule sets that define the problems and their resolutions in great detail. These approaches are often brittle; it is typically very costly for the business to add new rules and cases to these systems.

Still other Web-based systems check for particular textual content without the advantage of context or domain knowledge. Consequently, they generally do not reliably and consistently return the desired information. This is at least partly due to the fact that language is inherently ambiguous. Another factor, however, is because a single concept may be expressed in any number of ways using numerous and unrelated words and/or phrases. By simply searching for specific key words, the typical search engine fails to identify other alternatives that may also be helpful.

U.S. patent application Ser. No. 09/594,083, entitled "System and Method for Implementing a Knowledge Management System," describes a system and method for parsing documents into a series of concepts and tying the concepts to taxonomies. Queries, too, are parsed into a series of concepts and marked, for instance, with tags reflective of their taxonomy. The query and its tags are then used to search for documents relating to the query. The result is a list of documents which more closely matches the question being asked.

As noted above, the Internet has emerged as a preferred mechanism for making information available in a low cost manner. People both within and external to particular organizations are encouraged to access that organization's web site to retrieve answers to their questions. Ideally, the person accessing the web site receives the correct answer. An organization is, however, incapable of measuring the ability of a user to retrieve the correct answer without the use of metrics to measure satisfactory and unsatisfactory outcomes.

What is needed is a system and method for measuring the quality of information retrieval to help guide an organization's efforts in improving the web self-service system.

SUMMARY

In an information retrieval application, a system and method for detecting, among other things, content holes, customer experience issues, retrieval issues, customer areas of interest, product usage information, or overall information retrieval quality. A content body is parsed into a plurality of concepts nodes, including, for example, a first concept node, a relative and absolute number of documents that are tagged to that concept node, and a relative and absolute number of queries and/or dialog sessions that are tagged to that concept node. In one example, a percentage of successful service interactions is determined as a function of concept node and, if the percentage of successful service interactions at the first concept node is below a predefined threshold, a content hole is flagged. In another example, if the relative or absolute number of documents tagged to a concept node (or if the relative or absolute number of queries and/or dialog sessions tagged to the concept node) falls below a predefined threshold, a content hole is flagged.

According to another aspect of the present invention, in a defined information retrieval system in which quality of information retrieval is measured, a method of charging for services includes determining a percentage of successful service interactions in a typical information retrieval system, determining a percentage of successful service interactions for services provided in the defined information retrieval system, and billing as a function of the difference between the percentage of successful service interactions in a typical information retrieval system and the percentage of successful service interactions for services provided in the defined information retrieval system. In another embodiment, the method of charging for services may be a function of the total number of successful service interactions delivered over a predefined period of time. Other aspects of the present invention will become apparent as one reads the description below.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Figure 1:
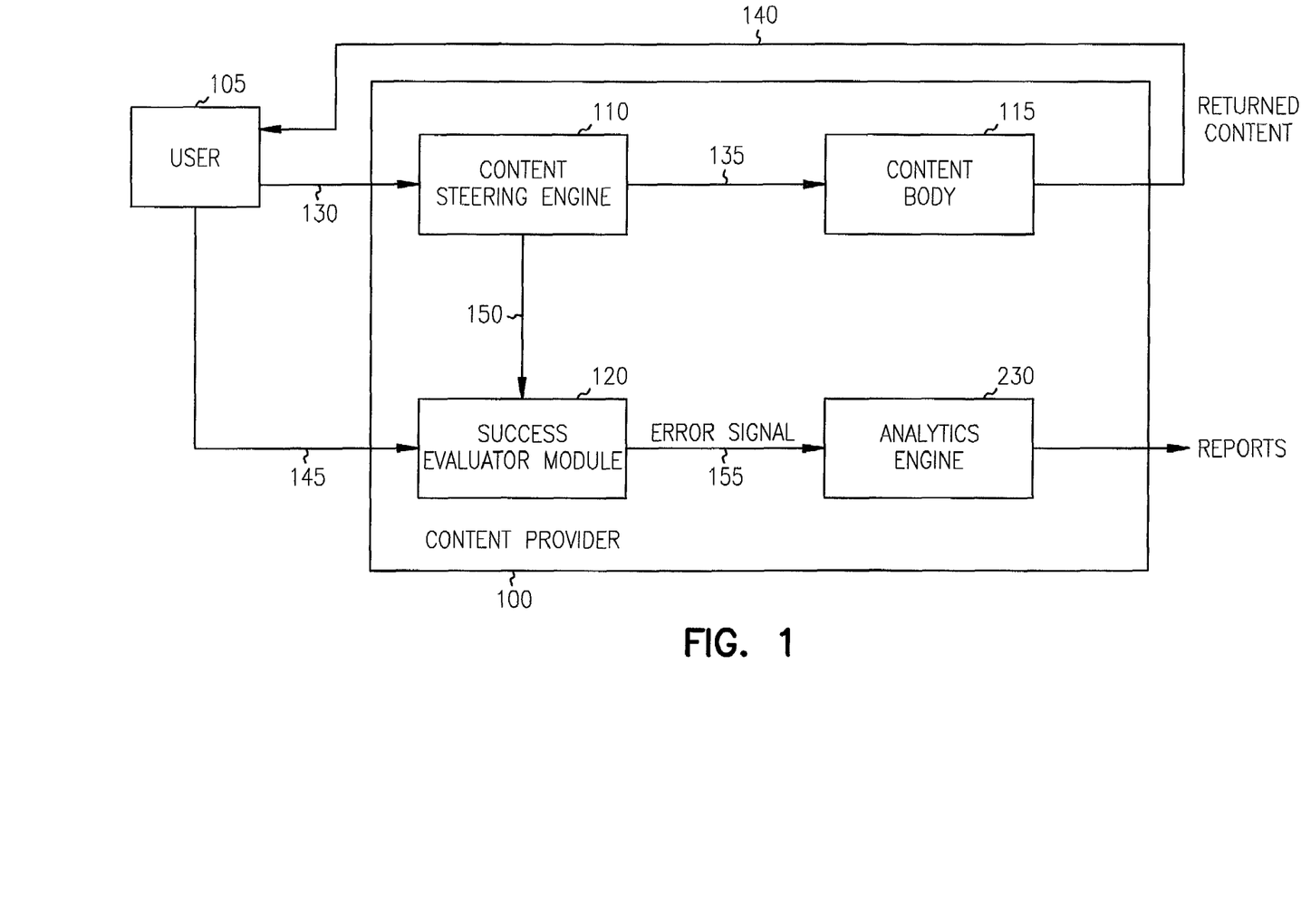
FIG. 1 is a block diagram illustrating an information retrieval system according to the present invention.

FIG. 1 is a block diagram of an information retrieval system 100 which receives queries from a user 105 and generates a list of one or more documents, files or other information content, services, or experts, in response. In this example, user 105 is linked to information retrieval system 100 by a communications network, such as the Internet, using a Web-browser or any other suitable access modality.

As noted above, an organization is incapable of measuring the ability of a user to retrieve the correct answer without the use of metrics to measure satisfactory and unsatisfactory outcomes. To provide such metrics, system 100 includes a success evaluator module 120 and an analytics engine 230. In addition, information retrieval system 100 includes, among other things, a content steering engine 110 for steering user 105 to relevant content within a body of content 115.

In one embodiment, a success evaluator module 120 determines whether the returned content met the user's needs, and provides a resulting "error" signal indicative of the level of the user's satisfaction with the returned content. In one such embodiment, success evaluator module 120 includes a system log for logging user/system interaction and the resulting document lists. Analytics engine 230 receives the error signal (and other information about the user/system interaction during the session) and outputs one or more reports as detailed below. The reports can then be used to adjust, either automatically or under system designer control, the content steering engine 110 and/or the content body 115 to improve subsequent user experience and information retrieval effectiveness, as well as to provide insight about customer interests, such as to marketing or product development functions within an organization hosting the information retrieval capability.

In FIG. 1, content steering engine 110 receives from user 105, at user interface 130, a request or query for content relating to a particular concept or group of concepts manifested by the query. Based on information extracted from the initial query and/or other information obtained from the user 105 during the same or a previous encounter, content steering engine 110 outputs at 135 indexing information relating to one or more relevant particular pieces of content, if any, within content body 115. In response, content body 115 outputs at 140 the relevant content, or a descriptive indication thereof, to user 105. Multiple returned content "hits" may be unordered or may be presented in a list ranked according to relevance to the user's query as determined by system 100. One embodiment of a retrieval process is described in "Retrieval Engine Query Enhancement System and Method," filed herewith, the description of which is hereby incorporated by reference.

Success evaluator module 120 determines whether, or to what extent, the returned content met the needs of user 105. The user's intent, however, may have been imperfectly expressed by user 105 in the request and/or imperfectly mapped by content steering engine 110. In this example, success evaluator module 120 receives from user 105, at 145, an indication of whether the returned content met the user's needs. In one implementation, this indication is obtained by pushing to the user's Web browser a dialog box asking user 105 whether the returned content met the user's needs, with "Yes" and "No" buttons for obtaining the user's mouse-click response. Another technique of obtaining user feedback includes sending a subsequent e-mail inquiry to the user asking whether the previous session was satisfactory, and receiving a return email indication of such success or failure. In another example, a human or machine makes a follow-up telephone inquiry to the user. Many other techniques exist for getting a direct input from user 105 informing success evaluator module 120 as to whether the returned content met the user's needs. Moreover, the user's response need not be binary, for example, the user could be asked to rate the satisfaction with the returned content on a scale of 1-10, etc.

In one embodiment, if a ranked list is presented to the user, the user is presented with an opportunity to rank the documents according to the user's assessment of each document's relevance. The resulting rank is compared to the original ranking, the differences are noted and the edge weights are adjusted accordingly.

In certain cases, however, a particular user 105 may not be willing or able to provide feedback regarding satisfaction with the returned content. In such a situation, in one embodiment, the satisfaction of such a nonresponsive user is extrapolated from that of another user who made a similar request, received similar returned content, and who was responsive in providing such feedback. In a further example, the satisfaction of a nonresponsive user is determined in part from information received by content steering engine 110, at 150. In one such implementation, the nonresponsive user's clickstream during a dialog session (i.e., an initial user query followed by one or more prompts by content steering engine 110 to obtain more information from the user to better steer the user to desired content) is compared to that of another user who was responsive. In another example, the information provided at 150 by content steering engine 110 includes a clickstream or session log about the user/provider interaction session. The session log includes, among other things, at least one of: information about graphical user interface (GUI) actions by the user (mouse clicks, selections, time intervals between user actions, etc.); information about the user (e.g., cookies from user 105 or information stored within content provider 100 representing user preferences, products owned by the user or other relevant customer information, etc.); or concepts that were the subject of the user/provider interaction session (e.g., from concept nodes in a knowledge map, as discussed below, or from any other representation of concepts within a knowledge/content base).

In one embodiment, direct user feedback information is neither expressly requested nor obtained from any user. In one such example, whether the user is satisfied with the returned content is inferred at least in part from an action taken by that user after receiving the returned content. In a CRM implementation, for example, user satisfaction may be inferred if the user (customer), before or after reviewing the descriptive indicator(s) of the returned content, opens a document and then leaves the Web site. Such events inferentially indicate success and communicating relevant information. Conversely, if in response to the query no documents are returned, or if the user opens several documents before leaving the Web site, then the CRM system has been less successful at efficiently meeting the user's needs for information. Additionally, if after using the website content provider 100, the same user 105 immediately opens a request for human-assisted service, either through a web interface or through a different medium (including, without limitation, telephone or Internet-based chat), that request inferentially implies that the prior interaction was not completely successful.

Success evaluator module 120 provides a signal at 155 to analytics engine 230. The signal indicates, among other things, whether information retrieval system 100 was successful at returning to user 105 content that matches the intent of user 105 as manifested in the user request or query.

The signal at 155 can include a binary-form signal, in which returned content that matches a user's intent is deemed a "successful service interaction" (SSI), and lack of returned content matching the user's intent is deemed a "nonsuccessful service interaction" (NSI). Alternatively, the signal at 155 can include more than two states (e.g., a probabilistic representation) to represent the degree of successfulness in serving the user's needs. An SSI can be characterized in a variety of different ways. In one example, an SSI is a measure of whether a user read a small number of documents and then terminated the session with the content provider, thereby inferring that the content provider was successful at efficiently servicing the user's needs. In another example, SSI is determined by comparing the user's clickstream, using regression or any other suitable technique, to clickstream pattern(s) deemed to be represent successful user/provider interaction sessions.

In response to one or more components of the error signal at 155, analytics engine 230 (which may incorporate additional human input, e.g., from a knowledge engineer) outputs one or more reports used to improve subsequent user experience. For example, if no content is returned in response to the user inquiry, success evaluator module 120 logs the user inquiry for reporting to a knowledge engineer. The knowledge engineer, in turn, creates content to fill the apparent "content hole," reclassifies existing content so that it is more accessible to subsequent similar user requests, or takes other appropriate remedial action to improve the experience of subsequent users.

Figure 2:
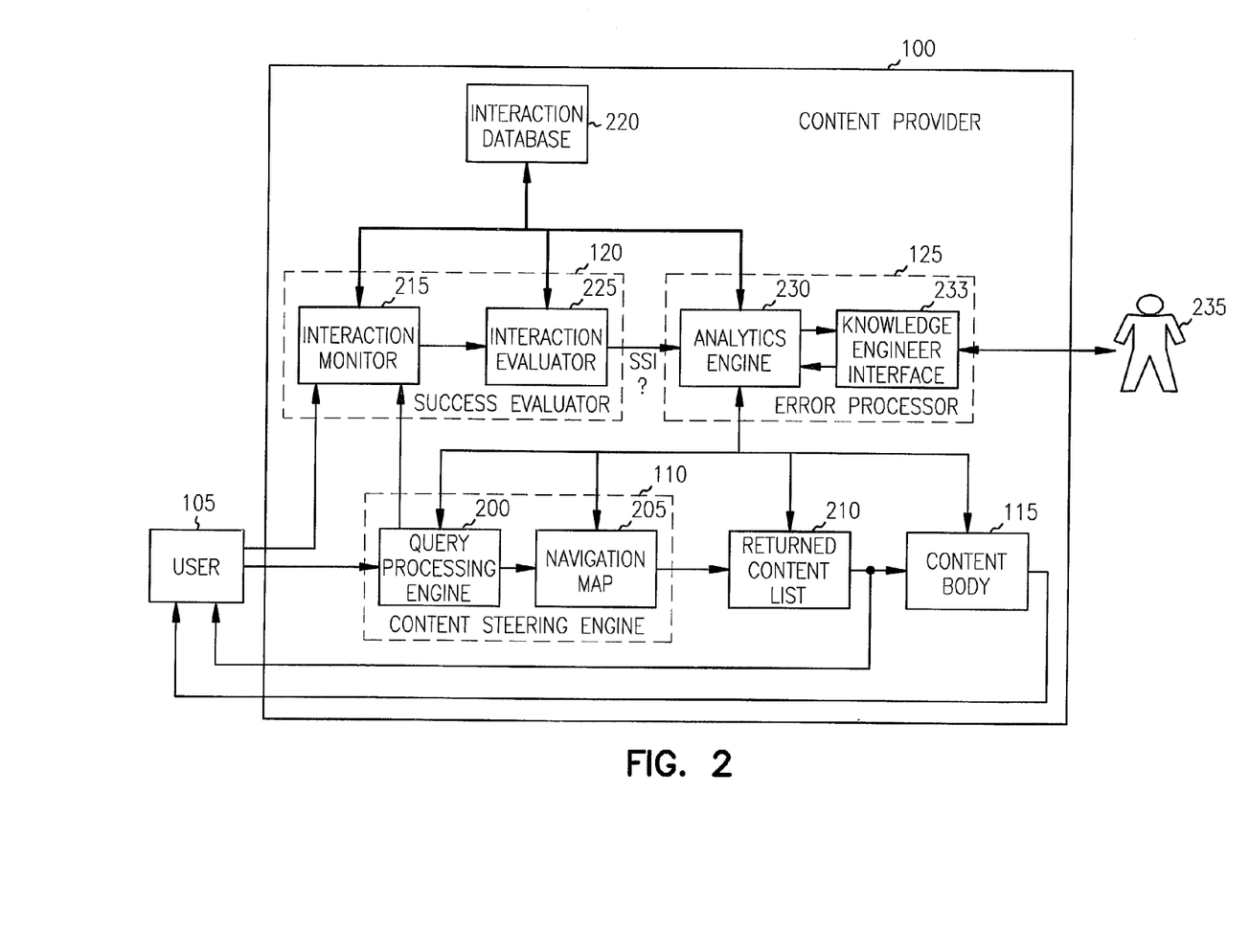
FIG. 2 is a block diagram illustrating generally an example of an adaptive information retrieval system.

As noted above, the output of analytics engine 230 can be used to provide feedback to an adaptive information retrieval system. One such adaptive information retrieval system is shown in FIG. 2. FIG. 2 is a block diagram illustrating generally one further example of a information retrieval system 100 and user 105. In this example, content steering engine 110 includes a query processing engine 200 for distilling request(s) from a user into one or more concepts, and a navigation map 205 for relating the requested concepts to corresponding pieces of content within the content body 115. Content steering engine 110 outputs to user 105 a ranked or unordered returned content list 210 with indicators that describe the nature of the returned pieces of content within content body 115 that appear to match the user's needs. Based on the descriptive information included in the returned content list 210, user 105 selects particular pieces of returned content for review. Success evaluator module 120 includes an interaction monitor 215 for monitoring the interaction between user 105 and information retrieval system 100.

The monitored interaction may include, among other things, language input by user 105 and/or output by query processing engine 200 during an interactive dialog session, cookie or metadata information about user 105, and/or a mouse clickstream representative of interaction between user 105 and query processing engine 200 during an interactive dialog session, or search results and concept nodes associated with a particular user/provider interaction session. The monitored interaction may be stored as a session log in an interaction database 220, and/or evaluated by an interaction evaluator 225 to determine whether the user session resulted in a successful service interaction (SSI).

In one example, this provides a logging capability in which:

Users may be logged not just with an ID but with all the concept node tags and metadata that represent what's known about the user. This allows analysis of the log broken down by users with particular properties;

Logging records each of the steps within a multiple-step dialog interaction with a user, as opposed to simply separate actions (clicks and queries). The session log thus logs series of interactions in coherent groups that can be analyzed together. In addition, these series allow sequential analysis of a user's actions. For example, the session log permits analysis not just of how many times users took the action of, say, escalating their problem to a human customer service representative, but what dialog sequences and user properties most often lead to escalation; and Logging is done in "semantic" terms—that is, according to concept-nodes within taxonomies. These taxonomies and concept-nodes represent dimensions and concepts that are relevant to the organization. As compared to normal world-wide-web logging, which simply provides undifferentiated "click" data, this concept-based logging allows analysis of the interaction data based on concepts that are truly relevant, as opposed to "syntactic," surface information such as word frequency of words typed into a query box.

Error processor 125 includes an analytics engine 230 that determines, based on the SSI error signal and/or the monitored interaction information, the underlying cause of any nonsuccessful service interactions (NSIs). In one example, information regarding NSI cause is provided through a knowledge engineer interface 233 to a knowledge engineer 235. Based on this information, knowledge engineer 235 returns appropriate instructions to analytics engine 230 for adjusting the content included within content body 115, adjusting the manner in which query processing engine 200 distills request(s) from a user 105 into one or more concepts, and/or adjusting the manner in which navigation map 205 correlates pieces of content within content body 115 to the requested concepts.

In one embodiment, adapting content provider system 100 is based on correlations between various factors. One possible factor is the success of each user/provider interaction session. Another possible factor is which concept nodes are associated with each user/provider interaction session. A further possible factor includes communications from user 105 during the session (e.g., text entered) and features extracted from the communication (such as by using techniques known in the art of text processing). Yet another possible factor includes information regarding the content presented and/or selected during the user/provider interaction session, along with information regarding concept nodes, in a knowledge map, to which the content is associated.

In one example of an automated adaptive process, correlations among these factors are obtained and, based on the correlations, one or more rankings or weightings in a content retrieval process is modified to either increase the assigned relevance of documents that are predicted to generate success based on previous experience with such correlations.

Although, in one embodiment, knowledge engineer 235 is a person providing human intervention into the process, it is understood that system adjustments in response to NSIs may alternatively be partially or fully automated. For example, where an NSI results from a returned content list being returned to user 105 and, based on the user's review of the descriptive indicators in the returned content list, the user decides that the pieces of returned content are not helpful, a weighting in the content steering engine is adjusted by a predetermined amount. This is accomplished by decreasing a request-to-concept weighting in query processing engine 200 and/or decreasing a concept-to-content weighting in navigation map 205. Because the occurrence of such NSIs modifies the manner in which content steering engine 110 operates, the likelihood of further such NSIs is reduced. One such approach to the use of feedback to modify the behavior of an information retrieval system 100 is described in "Adaptive Information Retrieval System and Method", filed herewith, the description of which is hereby incorporated by reference.

The success of system 100 in adapting is a function of its ability to detect and correct for variation from the ideal in presenting information. To further this capability, in one embodiment, error processor 125 includes an analytics engine 230 used to calculate an SSI percentage. Attempts are made within system 100 to drive the SSI percentage to one hundred percent. In one such embodiment, the SSI percentage is set equal to the percentage of sessions which resulted in at least one SSI. In one embodiment, system 100 is a multiple loop feedback control system which takes into account not only the SSI percentage calculation but also other system measurement. For example, the percentage of sessions which resulted in at least two SSIs can be a helpful feedback parameter for certain systems 100. Likewise, SSI percentage as a function of the concept searched can be useful in determining if a the number of answers associated with a concept are less than adequate.

In addition, the SSI percentage can be used to drive the development of content. For instance, if system 100 exhibits low SSI for a particular area of interest and the content within the area of interest is less than a predefined threshold, the operator is notified of a content hole. In one such embodiment, a record of queries resulting in no SSIs during a session within a particular area of interest is kept and used to drive the creation of content used to fill the content hole.

In one embodiment, iterative use of the content hole calculation is used to drive construction of content body 115 and its navigation map 205.

In one embodiment, content hole calculation may also factor in the number of documents associated with the concept nodes reflecting an area of the user's interest, and/or the number of queries associated with the area of interest. All other things being equal, the more queries and/or fewer documents about an area of interest is inferentially indicative of a content hole.

Figure 3:
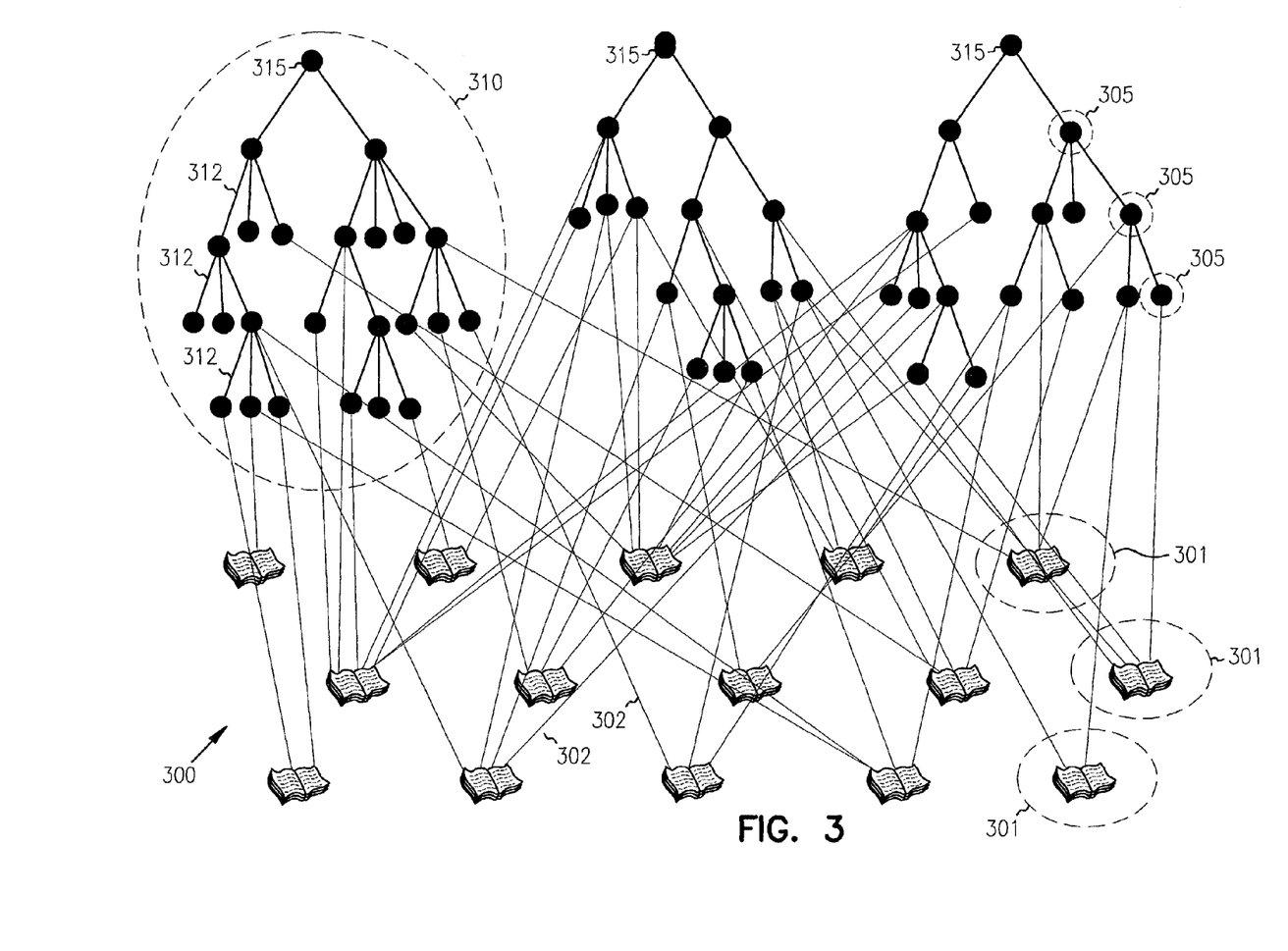
FIG. 3 is an example of a knowledge map.

In one embodiment a content steering 110 and content body 115 are linked via a knowledge map. As discussed in U.S. patent application Ser. No. 09/594,083 and incorporated herein by reference, and as illustrated here in the example of a knowledge map 300 in FIG. 3, pieces of content (referred to as knowledge containers 301) are mapped by appropriately-weighted tags 302 to concept nodes 305 in multiple taxonomies 310 (i.e., classification systems). Each taxonomy is a directed acyclical graph (DAG) or tree (i.e., a hierarchical DAG) with appropriately-weighted edges 312 connecting concept nodes to other concept nodes within the taxonomy and to a single root concept node 315 in each taxonomies. Thus, each root concept node effectively defines its taxonomy at the most generic level. Concept nodes that are further away from the root concept node in the taxonomy are more specific than those that are closer to the root concept node. Multiple taxonomies are used to span the body of content (knowledge corpus) in multiple different orthogonal ways.

As discussed in U.S. patent application Ser. No. 09/594, 083 and incorporated herein by reference, taxonomy types include, among other things, topic taxonomies (in which concept nodes represent topics of the content), filter taxonomies (in which concept nodes classify metadata about content that is not derivable solely from the content itself), and lexical taxonomies (in which concept nodes represent language in the content). Knowledge container 301 types include, among other things: document (e.g., text); multimedia (e.g., sound and/or visual content); e-resource (e.g., description and link to online information or services); question (e.g., a user query); answer (e.g., a CRM answer to a user question); previously-asked question (PQ; e.g., a user query and corresponding CRM answer); knowledge consumer (e.g., user information); knowledge provider (e.g., customer support staff information); product (e.g., product or product family information). It is important to note that, in this document, content is not limited to electronically stored content, but also allows for the possibility of a human expert providing needed information to the user. For example, the returned content list 210 of FIG. 2 herein could include information about particular customer service personnel within content body 115 and their corresponding areas of expertise. Based on this descriptive information, user 105 could select one or more such human information providers, and be linked to that provider (e.g., by e-mail, Internet-based telephone or videoconferencing, by providing a direct-dial telephone number to the most appropriate expert, or by any other suitable communication modality).

Figure 4:
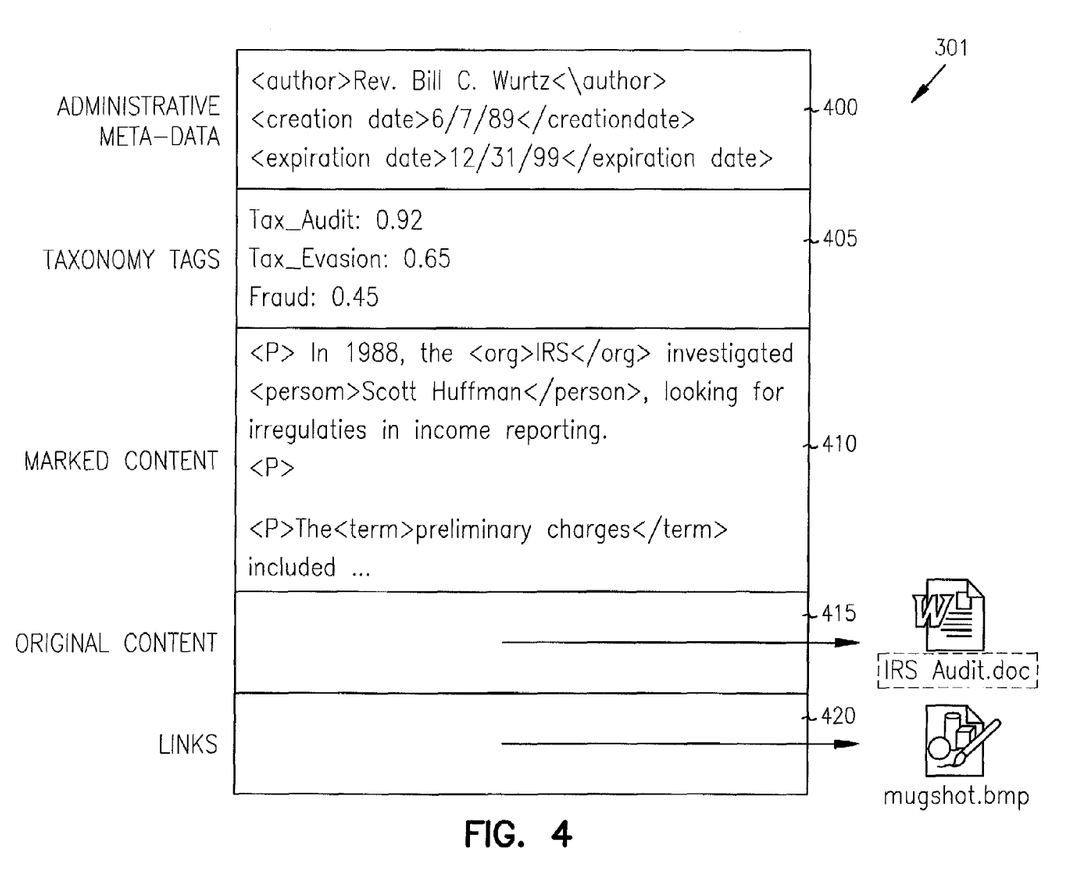
FIG. 4 is a schematic diagram illustrating generally one example of portions of a document-type knowledge container.

FIG. 4 is a schematic diagram illustrating generally one example of portions of a document-type knowledge container 301. In this example, knowledge container 301 includes, among other things, administrative metadata 400, contextual taxonomy tags 405, marked content 410, original content 415, and links 420. Administrative metadata 400 may include, for example, structured fields carrying information about the knowledge container 301 (e.g., who created it, who last modified it, a title, a synopsis, a uniform resource locator (URL), etc. Such metadata need not be present in the content carried by the knowledge container 301. Taxonomy tags 405 provide context for the knowledge container 301, i.e., they map the knowledge container 301, with appropriate weighting, to one or more concept nodes 305 in one or more taxonomies 310. Marked content 410 flags and/or interprets important, or at least identifiable, components of the content using a markup language (e.g., hypertext markup language (HTML), extensible markup language (XML), etc.). Original content 415 is a portion of an original document or a pointer or link thereto. Links 420 may point to other knowledge containers 301 or locations of other available resources.

U.S. patent application Ser. No. 09/594,083 also discusses in detail techniques incorporated herein by reference for, among other things: (a) creating appropriate taxonomies to span a content body and appropriately weighting edges in the taxonomies; (b) slicing pieces of content within a content body into manageable portions, if needed, so that such portions may be represented in knowledge containers 301; (c) autocontextualizing the knowledge containers 301 to appropriate concept node(s) 305 in one or more taxonomies, and appropriately weighting the taxonomy tags linking the knowledge containers 301 to the concept nodes 305; (d) indexing knowledge containers 301 tagged to concept nodes; (e) regionalizing portions of the knowledge map based on taxonomy distance function(s) and/or edge and/or tag weightings; and (f) searching the knowledge map for content based on a user query and returning relevant content.

It is important to note that the user's request for content need not be limited to a single query. Instead, interaction between user 105 and content provider 100 may take the form of a multi-step dialog. One example of such a multi-step personalized dialog is discussed in commonly assigned Fratkina et al. U.S. patent application Ser. No. 09/798,964 entitled, A SYSTEM AND METHOD FOR PROVIDING AN INTELLIGENT MULTI-STEP DIALOG WITH A USER, filed on Mar. 6, 2001, the dialog description of which is incorporated herein by reference in its entirety. That document discusses a dialog model between a user 105 and a content provider 100. It allows user 105 to begin with an incomplete or ambiguous problem description. Based on the initial problem description, a "topic spotter" directs user 105 to the most appropriate one of many possible dialogs. In this way, content provider 100 elicits unstated elements of the description, which user 105 may not know at the beginning of the interaction, or may not know are important. It may also confirm uncertain or possibly ambiguous assignment, by the topic spotter, of concept nodes to the user's query by asking the user explicitly for clarification. In general, content provider 100 asks only those questions that are relevant to the problem description stated so far. Based on the particular path that the dialog follows, the content provider discriminates against content it deems irrelevant to the user's needs, thereby efficiently guiding the user to relevant content. In one example, the dialog is initiated by an e-mail inquiry from the user. That is, the user sends an e-mail question or request to a CRM content provider seeking certain needed information. The topic spotter parses the text of the user's e-mail and selects a particular entry-point into a user-provider dialog from among several possible dialog entry points. The CRM content provider then sends a reply e-mail to the user, and the reply e-mail includes a hyperlink to a web-browser page representing the particularly selected entry-point into the dialog. The subsequent path taken by the user through the user-provider dialog is based on the user's response to questions or other information prompts provided by the CRM content provider. The user's particular response selects among several possible dialog paths for guiding the user to further provider prompts and user responses until, eventually, the CRM system steers the user to what the CRM system determines is most likely to be the particular content needed by the user.

For the purposes of the present document, it is important to note that the dialog interaction between user 105 and content provider 100 yields information about the user 105 (e.g., skill level, interests, products owned or services used, etc.). The particular dialog path taken (e.g., clickstream and/or language communicated between user 105 and content provider 100) yields information about the relevance of particular content to the user's needs as manifested in the original and subsequent user requests/responses. Moreover, interactions of user 105 not specifically associated with the dialog itself may also provide information about the relevance of particular content to the user's needs. For example, if the user leaves the dialog (e.g., using a "Back" button on a Web-browser) without reviewing content returned by content provider 100, an NSI may be inferred. In another example, if user 105 chooses to "escalate" from the dialog with automated content provider 100 to a dialog with a human expert, this may, in one embodiment, be interpreted as an NSI. Moreover, the dialog may provide user 105 an opportunity to rate the relevance of returned content, or of communications received from content provider 100 during the dialog. As discussed above, one or more aspects of the interaction between user 105 and content provider 100 is a feedback input for adapting content within content body 115, or adapting the way in which content steering engine 110 guides user 105 to needed content.

In one embodiment, analytics engine 230 includes three types of reports: user interest, system performance, and content management.

User Interest Reports

In one embodiment, system 100 includes a Top Visitors report, a Top Domains report, a Popular Documents report, a variety of query reports, a Top Products report and a User Detail report.

In one such embodiment, the Top Visitors report shows the top fifty visitors, the number of queries from each visitor and the SSI percentage. In one embodiment, the Top Domains report lists the fifty most frequent domains to visit the site. In one embodiment, the report is generated by drilling from the user name to a report listing session duration for each session ID. The system then drills from session ID to query strings and from the query strings to the documents they access. Such a report can be used, for instance, to target e-mail or other direct marketing activities to these users, or can be used to solicit user surveys.

In one such embodiment, the Top Domains report shows the top 50 domains, the number of queries from each domain and the SSI percentage. In one embodiment, the Top Domains report lists the fifty most frequent domains to visit the site. In one embodiment, the report is generated by drilling from the domain to the top users within the domain. The system then drills from the user name to a report listing session duration for each session ID and from there to query strings and from the query strings to the documents they access. Such a report can be used, for instance, to target advertising.

In one embodiment, the Popular Documents report shows the most accessed thousand documents for a specified time period.

In one embodiment, the query reports include a Popular Query (PQ) report, a Popular PQs report, a Query Listing report and a Top Query Terms report. The PQ Report provides an alphanumeric listing of PQs with their corresponding hit counts. In one embodiment, the list can be used to find the hit count for an individual PQ and escalate or de-escalate its presence on the site.

The Popular PQs report shows the most accessed hundred PQs for a specified period of time.

The Query Listing report shows all query strings for a given time period. In one embodiment, system 100 generates the report by drilling from query string to document title for documents returned in response to the query.

The Top Query Terms report lists the most prevalent terms used in visitor query strings. Terms may include individual keywords, multiword proper names, or phrases that are determined by the system or by a knowledge engineer to be meaningful or potentially meaningful in the domain.

In one embodiment, the Top Products report lists the most prevalently confirmed product concept nodes (i.e., concept nodes from a taxonomy in the knowledge map that has been designed to represent products or offerings, from the website owner or from a third-party, which are relevant to the domain of interaction) ranked in order of access frequency. In one such embodiment, each product also includes a value representing the increase or decrease in its ranking from the previous time period.

In one embodiment, the User Detail report includes all data about a particular user. Such data may include, among other things, user type, number of sessions with the content provider, number of queries to the content provider, links to the individual query detail log and session details. Such data may be restricted to a particular time period. In one embodiment, the User Detail report also includes, among other things, a list of documents accessed most often accessed or most recently accessed, etc. It may also include drop-out information for that individual, indicating where the particular user dropped out of a particular session. In one example, the point where the particular user dropped out of a particular session is characterized by where the user's interaction, before opening one or more pieces of returned content, terminated or lapsed for more than a predetermined period of time (e.g., 60 minutes, etc.), from which it may be inferred that the interaction was complete from the user's perspective. The interaction may terminate in a number of possible states. For example, after entering the query; after answering one, two, or more pages of dialog queries; after the system had no more dialog queries to present; after reviewing a hit list of retrieved documents; or after receiving an indication that no documents matched the query and subsequent dialog. Each of these states may be reported against as being where a drop-out occurred.

System Performance Reports

In one embodiment, system 100 includes a number of system performance reports. For instance, in one embodiment, system 100 generates a Site Traffic Analysis Report which lists counts, for a particular period of time, of all user sessions with information retrieval system 100, of all queries by all users or by a particular user, of the number of SSIs, of total visitors to information retrieval system 100, of new visitors, and of documents viewed. The report may also indicate the average time duration of sessions and/or document viewing, and an SSI percentage as a fraction of total user interactions.

In one embodiment, system 100 includes a Session Overview report. The Session Overview report includes a session count for a particular period of time, an average session duration, and an SSI percentage for the particular time period.

In one embodiment, system 100 includes a Session Duration report. The Session Duration report includes a chart that analyzes aggregated user sessions over ranges of time increments. It can be used, for example, to determine how long the majority of your users are spending on the site.

In one embodiment, system 100 includes a Query Overview report. The Query Overview report includes query counts, average query duration, most popular path through a dialog, and a ranking of the popularity of particular paths through dialogs, etc., over a specified time period.

In one embodiment, system 100 includes an All Visitors report. This report includes all user login names for a particular time period and the number of queries associated with each user.

In one embodiment, system 100 includes a Visitor Overview by User Currency report. This report provides a total visitor count, the number of new users, and the number of returning users for a particular time period. One such report breaks the total number of visitors to your site down between new visitors and returning visitors. This capability exploits user logins, cookies, certificates, or any other mechanism of identifying users on the website. This report may be used to understand the impact of the information retrieval experience on a users' website usage by tracking the relative number of repeat or one-time users.

In one embodiment, system 100 includes a Visitor Overview by User Type report. This report includes the total number of users broken down by user type (e.g., internal (within the content provider's organization), external, or partner) and their corresponding SSIs for a particular time period. In one such embodiment, the user type definition is customized for each site. In one such embodiment, the user type definition includes the concept nodes to which users and/or their interactions are mapped, in one or a plurality of taxonomies in a knowledge map.

In one embodiment, system 100 includes an SSI Percentage By Path report. This report includes a listing of the failure point nodes in the system (e.g., concept nodes corresponding to displayed documents in a returned content list when a user abandons the session without opening a document), along with the SSI percentage for user interactions following that particular dialog path and the raw SSI numbers for each listed path. Such a report can be used to show the relative health of paths within system 100. It is especially interesting when compared to revenue data to determine whether a particular product is more or less expensive to support than the average product.

In one embodiment, system 100 includes a SSI Percentage By User Currency report. This report includes the SSI percentage and SSI count for new users vs. the same information for returning users. It can be used to show how often new users successfully find documents vs. returning users. If one or the other user group is especially unsuccessful, this is cause for a possible maintenance update.

In one embodiment, system 100 includes a Percentage By User Type report. This report includes information regarding the SSI percentage and SSI count for given user types. In one embodiment, user types are customized for the site (e.g., internal vs. external vs. partner/affiliate users). In one example, this report provides a pie chart of SSI Percentage vs. User Type (internal, external, partner/affiliate in the above example). It can be used to show how often each "user type" successfully finds a document. If any one particular user type is especially unsuccessful, this is cause for a possible maintenance update.

In one embodiment, system 100 includes a Dropout report. This report shows the distribution of user interactions across various exit points in the system. This is useful for, among other things, ascertaining how many users exited a session during a particular dialog or how many users exited a session after seeing an empty returned content listing (e.g., "No Documents" page) indicative of a content hole. In one embodiment, the various stages for exit are: during dialog, at the document list, at the "no docs found" page, and after reading a document. The frequency in which an exit point is used is a good indicator of the success the user had in getting an answer to his or her query.

In one embodiment, system 100 includes a Knowledge Engineer Sub-Path report. This report includes information regarding the number of documents remaining at each iteration of a dialog and indicates where a user might have given up on a dialog.

In one embodiment, system 100 includes a Weighted SSI Percentage Based on Path and Usage report. This report includes information about the SSI percentage for a particular user interaction session, where the SSI percentage is normalized to account for the number of user interaction sessions that follow the same dialog path. This report is useful because, for example, if many users follow the same dialog path, even a small decrease in the SSI percentage represents a significant impact on the relevant user population. Conversely, for a relatively unused dialog path, a very low SSI percentage may not greatly impact the relevant user population.

In one embodiment, system 100 includes a SSI Percentage By Concept Node report. This report includes information regarding the SSI percentage for each concept node in system 100.

In one embodiment, system 100 includes a Question Report. This report includes information regarding the time that a user took to respond to each dialog question. This information may be organized according to dialog question or concept node (e.g., based on which dialog question was asked).

In one embodiment, system 100 includes a Query Dropout Report By Path. This report includes information, for each dialog path, of where users dropped out. It allows a Knowledge Engineer or other such system designer to determine the dialog paths that are problematic, and where, within the problematic paths, efforts should be focused.

In one embodiment, system 100 includes a Question Dropout by Page Flip report. This report indicates when, in terms of a sequence of web page flips that constitute an interaction session, users choose to abandon or terminate the interaction either before or after viewing content. In one example, this report includes the dropout or "terminal" page (as discussed above) as a function of the number of pages, or partial interactions, presented to the user before the user drops out. The report viewer may indicate how many interactions (e.g., all interactions or only unsuccessful interactions) lasted for only one page, for two pages, and so on.

In one embodiment, system 100 includes a Session Detail report. This report includes a complete log of a user interaction session with the content provider.

In one embodiment, system 100 includes Query Detail Report. This report includes all data about a particular user query.

In one embodiment, system 100 includes a Document Detail Report. This report includes all data about a particular document, knowledge container, or piece of content. Such data may include, among other things, a list of the concept nodes to which the document is tagged (i.e., mapped), how many times the document has been accessed over a particular time period, and when the document was most recently accessed.

In one embodiment, system 100 includes a Popular Question (PQ) Report. This includes all data about a particular PQ. Such data may include, among other things, the type of PQ, the concept nodes to which the PQ is tagged (i.e., mapped), how many times the PQ has been accessed over a particular time period, and when the PQ was most recently accessed.

Content Management Reports

In one embodiment, system 100 includes a number of content management reports. For instance, in one embodiment, system 100 includes a Document Report. This report includes an alphanumeric list of all documents with their corresponding hit counts. In one embodiment, the documents are listed alphabetically, so that the knowledge engineer can look up the hit count for a particular document or slice. Documents with low hit counts may not be relevant, or may be poorly mapped. In one embodiment, the documents are listed in an order that is representative of the number of times they were hit. In one embodiment, the documents are listed in order of a unique identifier internal to system 100 or in an external document repository (such as a website, in which case the unique identifier would be a URL) so that they may be easily reviewed based on this identifier. In some embodiments, the hit count is defined as the number of times that the document is presented to users; in others, the hit count is defined as the number of times the document is viewed or downloaded by users.

In one embodiment, system 100 includes a Document Type Report. This report includes a listing of the number of times each type of document was accessed and a P/V ratio for each type. A P/V ratio represents the number of times a specific document (or other content) is presented relative to the number of times the document (or other content) is actually viewed by the user. Documents with a high P/V ratio are determined by the relevant user population to be less relevant when presented. This could signal the need for improvement in tagging the document, or in the wording of title and summary information presented to the user. It could also be a result of a document that is either less valuable to users or valuable in relatively few instances.

In one embodiment, system 100 includes a Oldest/Coldest Documents Report. This report shows the frequency with which documents in the system are accessed. In one embodiment each report includes a listing of all documents that have not been accessed over a preceding time period, sorted in descending order by the length of time in which they have not been accessed. Stale documents may be replaced or eliminated.

In one embodiment, system 100 includes a Orphaned Documents Report. This report includes a listing of documents that cannot be accessed by any of the standard user/provider dialogs. This listing may be arrived at, for example, by comparing a documents taxonomy tags to a list of taxonomies deemed to be of particular interest. If, for example, in a knowledge-mapped system the number of documents that fail to tag to dialog-inducing taxonomies increases dramatically, one may need to modify the system settings to bring the system back into equilibrium.

In one embodiment, system 100 includes a Popular Question (PQ) Type Report. This report shows the percentage of PQ hits by PQ types (e.g., in a pie chart). In one embodiment, PQ types include break/fix, how-to, upsell and web service.

In one embodiment, system 100 includes a Knowledge Engineer Snapshot Report. This report includes information regarding the number of taxonomies, concept nodes, terms, triggers, documents, and other information about the nature of the knowledge base or content body and the mapping thereof.

In one embodiment, system 100 includes a Knowledge Engineer Query Export Tool Report. This report shows extracted user query strings from the system logs in a format which can be used to test or train system 100.

In one embodiment, system 100 includes a Test Histories report which displays scores for various testing and training mechanisms.

In one embodiment, system 100 includes a Compatibility Analysis report which allows the user to compare two or more disparate dimensions from a client-specific set of dimensions. These reports may be used to correlate properties of particular taxonomies with each other in the system: for example, user types vs activities (to learn what different kinds of customers are doing with their products) or products vs. symptoms (to learn what kinds of problems are being experienced with particular products). In one embodiment, the comparison may be done with respect to the number of user queries and dialogs associated with the combinations of concept nodes in the selected taxonomies. In one embodiment, the comparison may be done with respect to the SSI percentage of user queries and dialogs associated with the combinations of concept nodes in the selected taxonomies. In one embodiment, the comparison may weight these SSI percentages with the number of queries to create an aggregate number.

In one embodiment, system 100 includes a Content Hole Report. This report includes a content hole score for a specific concept node. In one example, the content hole score is calculated by comparing the number of user queries mapped to a particular concept node to the number of documents, knowledge containers, or other content mapped to that concept node. In another example, a percentage of successful service interactions is determined as a function of concept node and, if the percentage of successful service interactions at the first concept node is below a predefined threshold, a content hole is flagged. In a further example, if the relative or absolute number of documents tagged to a concept node (or if the relative or absolute number of queries and/or dialog sessions tagged to the concept node) falls below a predefined threshold, a content hole is flagged.

In one embodiment, system 100 includes a Document Distribution Report which shows the number of documents, knowledge containers, or other content mapped to a particular concept node.

In one embodiment, system 100 includes a Query Distribution Report which shows the number of queries mapped to a particular concept node.

In one embodiment, system 100 includes a Terms By Query Strings Report. This report shows all user query strings that contain a particular term. In one embodiment, the report includes SSI information associated with each query string.

Analytics Engine Application

In one embodiment, the analytics engine is used to determine if there is a content hole in the information database. In one such embodiment, system 100 looks at combinations of context (e.g., printer queries and printer installation, or name of company and type of printer) and at the uncombined context. Next, system 100 turns to the SSI and tries to breakdown the SSI by specific concepts. For example, in certain systems the "path" question is particularly useful for differentiating between success rates. Finally, system 100 looks at the amount of content associated with each concept node, or with each type of content.

Each of these measurement mechanisms, when used alone, provide useful information which can be used to train, test or evaluate system 100. It is, however, when two or more of these measurements are used in concert that the system is most effective in identifying particular system needs or deficiencies. In the case of a feedback system such as is described in "Adaptive Information Retrieval System and Method", filed herewith, the description of which is hereby incorporated by reference, these measurements of system needs or deficiencies are used to drive adaptation within system 100 by, for instance, modifying content node edge weights as a function of the measurements.

For instance, if system 100 exhibits a low SSI for a particular area of high interest and there is limited content in that area, there is a content hole.

In one embodiment, a content hole score is calculated for each concept node CN as $\log((DC(CN)/DC(All))/(QF(CN)/QF(All)))$ where DC(CN) is the number of documents tagged to concept CN;

DC(All) is the average document count tagged to all concepts;

QF(CN) is the number of queries in the logging period tagged to concept CN; and

QF(All) is the average number of queries in the logging period tagged to all concepts.

In another example, a content hole score is calculated as Concept Hole Score=$\text{Log}_{10}$ ((number of documents tagged/number of queries) at a concept/average score) where average score=average of ((number of documents/number of queries) at all concepts).

A positive number is good and a negative one is bad. In other words, the more queries you have, the more documents you should have to answer those queries.

An alternate form of content hole score can also be used. In one embodiment, the percentage of successful service interactions at a node is a factor in determining whether a content hole exists. That is, the lower the SSI percentage (or relative SSI percentage) is, the higher the likelihood of a content hole.

Yet a third kind of content hole score uses only the SSI percentage and the query count. That is, where are the problems occurring (regardless of whether there are lots of documents nominally tagged there)? In one embodiment, data warehousing software from Cognos is used to process raw transactional data and to store the processed data in a data warehouse. In one such embodiment, system 100 is based on rules written by the knowledge engineer that run on top of the Cognos data warehouse.

In one embodiment, the SSI percentage is used to charge for services. For instance, the system may charge for services by determining a percentage of successful service interactions in a typical information retrieval system, determining a percentage of successful service interactions for services provided in the defined information retrieval system and billing as a function of the difference between the percentage of successful service interactions in a typical information retrieval system and the percentage of successful service interactions for services provided in the defined information retrieval system. Or, in another embodiment, the method of charging for services may be a function of the total number of SSIs delivered over a predefined period of time.

In one such embodiment, billing is weighted as a factor of the relative importance of particular nodes. That is, if the organization wants to emphasize customer service to particularly profitable products, or to topics of interest to large clients, the billing for that organization could be made a function of those concept nodes. To do this, in one embodiment, content body 115 would be parsed into a plurality of concept nodes and a percentage of successful service interactions is determined for each concept node. Billing would then be a function not only of the difference between the percentage of successful service interactions in a typical information retrieval system and the percentage of successful service interactions for services provided in the defined information retrieval system but would also include weighting successful interactions as a function of concept node. Or, in another embodiment, billing would be a function of the total number of SSIs at the weighted concept nodes multiplied by the weight of those nodes.

In the above discussion and in the attached appendices, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A computer-assisted method for detecting content holes, comprising:
    accessing a content body organized into a plurality of concept nodes to which content is selectively pre-tagged before receiving a user query as part of a service interaction,
    wherein the content body includes a first concept node;
    determining a percentage of successful service interactions as a function of concept nodes; and
    if the percentage of successful service interactions related to the first concept node is below a predefined threshold, flagging a content hole and presenting an indication of the flagged content hole to a user or a computerized process.

2. A computer-readable medium having instructions that, when executed in a computer, detects content holes-by:
    accessing a content body organized into a plurality of concept nodes to which content is selectively pre-tagged before receiving; a user query as part of a service interaction,
    wherein the content body includes a first concept node;
    determining a percentage of successful service interactions as a function of concept nodes; and
    if the percentage of successful service interactions related to the first concept node is below a predefined threshold, flagging a content hole and presenting an indication of the flagged content hole to a user or a computerized process.

3. A computer-assisted method of charging for services, comprising:
    determining a percentage of successful service interactions in a first information retrieval system;
    determining a percentage of successful service interactions for services provided in a second information retrieval system; and
    billing as a function of the difference between the percentage of successful service interactions in the first information retrieval system and the percentage of successful service interactions for services provided in the second information retrieval system.

4. The computer-assisted method according to claim 3, wherein determining a percentage of successful service interactions for services provided in the second information retrieval system includes:
    accessing a content body organized into a plurality of concept nodes to which content is selectively pre-tagged before receiving a user query as part of a service interaction, wherein the content body includes a first concept node;
    determining a percentage of successful service interactions as a function of concept nodes; and
    wherein billing as a function of the difference between the percentage of successful service interactions in the first information retrieval system and the percentage of successful service interactions for services provided in the second information retrieval system includes weighting successful interactions as a function of concept nodes.

5. A computer-readable medium having instructions when executed in a computer, charges for services by:
- accessing a content body organized into a plurality of concept nodes to which content is selectively pre-tagged before receiving a user query as part of a service interaction, wherein the content body includes a first concept node;
- determining a percentage of successful service interactions in a first information retrieval system;
- determining a percentage of successful service interactions for services provided in a second information retrieval system; and
- billing as a function of the difference between the percentage of successful service interactions in the first information retrieval system and the percentage of successful service interactions for services provided in the second information retrieval system, wherein the billing includes weighting successful interactions as a function of concept nodes.

6. A computer-assisted method for detecting content holes, comprising:
- (a) accessing a content body organized into a plurality of concept nodes to which content is selectively pre-tagged before receiving a user query as part of a service interaction, wherein the content body includes a first concept node;
- (b) determining a percentage of successful service interactions (SSIs) as a function of concept nodes;
- (c) determining a percentage of queries as a function of concept nodes;
- (d) determining a percentage of documents as a function of concept nodes;
- (e) computing a content hole score for the first concept node as a function of at least one of (b), (c), and (d); and
- (f) flagging a content hole if the content hole score is below a predefined threshold and and presenting an indication of the flagged content hole to a user or a computerized process.

7. A computer-assisted method of charging for services, comprising:
- determining a percentage of successful service interactions in an information retrieval system over a period of time; and
- billing as a function of the percentage of successful service interactions in the information retrieval system over the period of time.

8. The computer-assisted method of claim 1, wherein each concept node represents a concept in the content body.

9. The computer-assisted method of claim 1, wherein the successful service interaction comprises a query from a user for which returned content matches that user's intent.

10. The computer-assisted method of claim 3, wherein the successful service interaction comprises a query from a user for which returned content matches that user's intent.

11. The computer-assisted method of claim 4, wherein each concept node represents a concept in the content body.

12. The computer-assisted method of claim 4, wherein the successful service interaction comprises a query from a user for which returned content matches that user's intent.

13. The computer-assisted method of claim 6, wherein each concept node represents a concept in the content body.

14. The computer-assisted method of claim 6, wherein the successful service interaction comprises a query from a user for which returned content matches that user's intent.

15. The computer-assisted method of claim 7, wherein the successful service interaction comprises a query from a user for which returned content matches that user's intent.

16. The computer-assisted method of claim 6, wherein the acts (a)-(f) are performed in the order presented in claim 6.

* * * * *